F. X. MÜLLER & G. J. WINTER.
CONDUIT CONNECTION.
APPLICATION FILED FEB. 8, 1916.
1,218,444.
Patented Mar. 6, 1917.
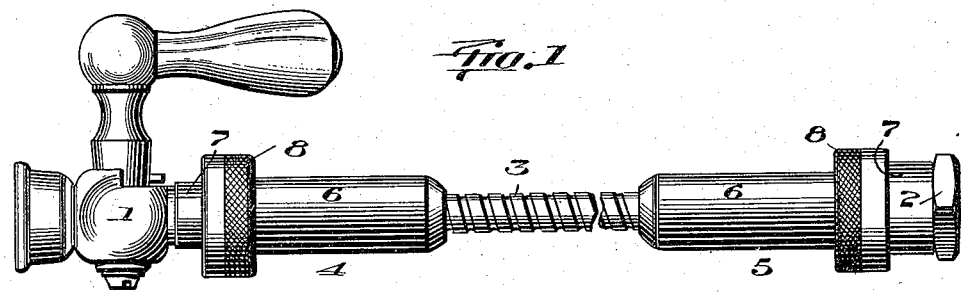
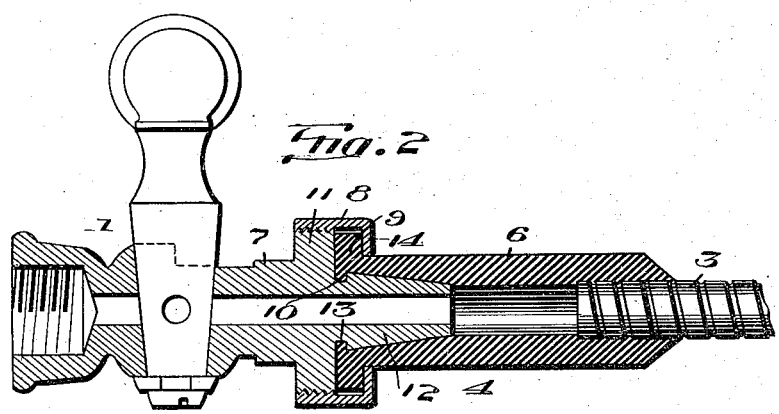
WITNESSES:
INVENTORS
BY
ATTORNEYS.

UNITED STATES PATENT OFFICE.

FRANK X. MÜLLER AND GEORGE J. WINTER, OF BUFFALO, NEW YORK, ASSIGNORS TO THE REPUBLIC HOSE COUPLER CORPORATION, OF BUFFALO, NEW YORK.

CONDUIT CONNECTION.

1,218,444.      Specification of Letters Patent.      Patented Mar. 6, 1917.

Application filed February 8, 1916. Serial No. 77,080.

*To all whom it may concern:*

Be it known that we, FRANK X. MÜLLER and GEORGE J. WINTER, citizens of the United States, residing at Buffalo, in the county of Erie and State of New York, have invented new and useful Improvements in Conduit Connections, of which the following is a specification.

Our present invention pertains to conduit connections for interposition between house pipes and stoves and other devices to be supplied with gas; and it has for its object to provide an absolutely safe connection that cannot be pulled apart, and one that is not liable to leak, even after a long period of use, and yet is inexpensive and is so simple that it can be expeditiously and easily adjusted without the employment of skilled labor or tools other than a wrench.

Other objects of the invention will be fully understood from the following description and claim when the same are read in connection with the drawings, accompanying and forming part of this specification, in which:

Figure 1 is a broken elevation showing our novel connection complete.

Fig. 2 is a longitudinal section taken through one of the couplings comprised in the connection.

Similar numerals of reference designate corresponding parts in both views of the drawings.

In the present and preferred embodiment of our invention, the connection comprises a cock 1 for connection with a house pipe, a fixture 2 for connection to a gas stove or other device to be supplied with gas, a hose section 3, a coupling 4 intermediate the cock 1 and the hose section 3, and a coupling 5 intermediate the fixture 2, and said hose section. The couplings 4 and 5 are identical in construction though reversely arranged. and, therefore, a detailed description of the one shown in Fig. 2 will suffice to impart a definite understanding of both. By reference to Fig. 2 it will be readily understood that each coupling comprises an exteriorly-straight tubular rubber portion 6 at the end of the hose section 3, a nipple 7 on the opposed element (cock 1 or fixture 2) and a collar 8. The straight tubular rubber portion 6 is originally formed at its outer end, which is square or disposed at right angles to its length, with a circumferential square flange 9 and an interior flange 10, the latter being, by preference, comparatively small in about the proportion illustrated. The nipple 7 is provided with a large circular portion 11, the face of which is square and the perimeter of which is threaded as shown, and an outwardly tapered central, exteriorly smooth and tubular teat 12, having a circumferential square groove 13, located immediately adjacent to the face of the said portion 11. The exterior taper of the nipple teat 12 extends continuously from the groove 13 to the end of the teat, so that the rubber portion 6 may be moved inwardly on the teat, without obstruction, until the flange 10 of said portion 6 springs into the groove 13, whereupon the portion 6 will be positively connected with the nipple, and the square end of said portion will be snugly held against the face of the nipple portion to make a tight coupling. The collar 8 is interiorly threaded to engage the threaded perimeter of the nipple portion 11, and is provided at its inner end with an inwardly-directed square flange 14, designed and adapted to bring up against the circumferential flange 9 of the rubber portion 6.

It will be manifest from the foregoing that in order to effect a perfectly safe and gas-tight connection of the tubular rubber portion 6 to the nipple 7, it is simply necessary to crowd said portion 6 on the teat 12 of the nipple until the flange 10 springs into the groove 13 of the teat, whereupon the square flanged end of the rubber portion will be opposed to the square face of the circular portion of the nipple, this to contribute to the gas-tight capacity of the coupling. Then the collar 8 is moved on the rubber portion 6 until its flange 14 brings up against the flange 9 of portion 6, and said collar is turned on the threaded perimeter of the circular nipple portion 11, with the result that the rubber portion 6 will be positively connected to the nipple 7 in such manner that there is no liability of the coupling elements being pulled or otherwise moved apart. It will also be manifest that the turning of the collar 8 on the nipple portion 11 will be attended by compression of the flange 9 of the rubber portion 7 against the face of said nipple portion 11 which will also contribute materially to the gas-tight capacity of the coupling.

Notwithstanding the reliability of our conduit connection as pointed out in the foregoing, it will be apparent that the connection may, when desired, be expeditiously and easily detached as a unit from the house pipe and the gas stove or other article to be supplied with gas; it being understood that the nipple 7 at the right of Fig. 1 is threaded or otherwise suitably connected to the gas stove or other article.

Having described our invention, what we claim and desire to secure by Letters-Patent, is:

A coupling comprising a nipple having a comparatively large circular portion threaded on its perimeter and square at its inner side and also having a central teat extending inwardly from said circular portion, and a circumferential groove in said teat immediately adjacent to the face of the circular portion, the exterior of said teat being continuously smooth and tapered from said groove to the teat end; and an exteriorly-straight tubular rubber portion receiving the teat of the nipple and formed originally with a square end that is opposed to the circular portion of the nipple and also formed originally at said end with an exterior flange and an interior flange, the latter seated in the groove of the teat; and a collar mounted on the rubber portion and having an inwardly-directed flange bearing against the exterior flange of the rubber portion and also having an inwardly threaded portion receiving and engaging the threaded perimeter of the nipple.

In testimony whereof we have hereunto set our hands in presence of two subscribing witnesses.

FRANK X. MÜLLER.
GEORGE J. WINTER.

Witnesses:
WM. G. SHOEMAKER,
LESLIE J. BURNETT.

Copies of this patent may be obtained for five cents each, by addressing the "Commissioner of Patents, Washington, D. C."